US006985150B2

(12) United States Patent
Deering

(10) Patent No.: US 6,985,150 B2
(45) Date of Patent: Jan. 10, 2006

(54) ACCELERATOR CONTROL UNIT CONFIGURED TO MANAGE MULTIPLE HARDWARE CONTEXTS

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 166 days.

(21) Appl. No.: 10/403,999

(22) Filed: Mar. 31, 2003

(65) Prior Publication Data

US 2004/0189650 A1 Sep. 30, 2004

(51) Int. Cl.
G06T 1/20 (2006.01)
G06T 1/00 (2006.01)
G06F 15/80 (2006.01)
G06F 15/16 (2006.01)

(52) U.S. Cl. ............ 345/506; 345/505; 345/502; 345/501

(58) Field of Classification Search .......... 345/506, 345/505, 502, 501
See application file for complete search history.

(56) References Cited

U.S. PATENT DOCUMENTS

| 5,084,815 | A | * | 1/1992 | Mazzario ............ 707/7 |
| 5,408,606 | A | * | 4/1995 | Eckart ............ 345/505 |
| 5,448,735 | A | * | 9/1995 | Anderson et al. ...... 718/100 |
| 5,757,385 | A | * | 5/1998 | Narayanaswami et al. .. 345/505 |
| 5,999,196 | A | * | 12/1999 | Storm et al. ........ 345/506 |
| 6,762,763 | B1 | * | 7/2004 | Migdal et al. ....... 345/506 |
| 6,775,728 | B2 | * | 8/2004 | Zimmer et al. ....... 710/260 |
| 2002/0184294 | A1 | * | 12/2002 | Volkoff et al. ...... 709/104 |
| 2003/0137518 | A1 | * | 7/2003 | Hiwada et al. ....... 345/506 |

OTHER PUBLICATIONS

Breitfelder, K.; Messina, D. The Authoritative Dictionary of IEEE Standards Terms. 2000. IEEE Press. Seventh Edition. p. 993.*

* cited by examiner

Primary Examiner—Kee M. Tung
Assistant Examiner—Joni Hsu
(74) Attorney, Agent, or Firm—Meyertons Hood Kivlin Kowert & Goetzel, P.C.; Jeffrey C. Hood; Mark K. Brightwell

(57) ABSTRACT

A control unit for a graphics accelerator. The control unit includes a plurality of processing pipelines, a memory (configured to store an allocation table) and a context management unit. The context management unit is configured to: (a) receive a graphics command, (b) decode a process identifier from input data provided in or with the graphics command, wherein the process identifier corresponds to one of a plurality of host processes executing on one or more central processing units external to the graphics accelerator, and (c) identify an entry E in the allocation table that corresponds to the process identifier. In response to a first set of conditions, the context management unit is further configured to: (d) reassign ownership of a first of the processing pipelines from a first active entry of the allocation table to the entry E, and (e) send the graphics command to the first processing pipeline.

22 Claims, 19 Drawing Sheets

US 6,985,150 B2

ACCELERATOR CONTROL UNIT CONFIGURED TO MANAGE MULTIPLE HARDWARE CONTEXTS

BACKGROUND OF THE INVENTION

1. Field of the Invention

This invention relates generally to the field of computing graphics and, more particularly, to a system and method for managing context switching in a graphics accelerator.

2. Description of the Related Art

Modern operating systems are configured to handle the execution of multiple processes in a time-sharing fashion. Processes may require the services of a graphics accelerator. The processes send (or induce the transfer of) graphics commands to the graphics accelerator. The processing behavior exhibited by the graphics accelerator in response to a graphics command X(k) may depend previous commands X(k−n), n>0. In other words, the response of the graphics accelerator to graphics command X(k) depends on the state of the accelerator which has been established by a number of previous commands X(k−n). Thus, when an operating system switches from execution of a first process to a second process, the state of the first process needs to be saved and the state of the second process needs to be loaded into a set of registers, tables, memories of the graphics accelerator. The bandwidth required to transfer state information from the graphics accelerator to a host computer (executing the operating system) and vice versa may be nontrivial in so far as modern graphics computing requires a significant amount of state information. Thus, there exists a need for a system and method capable of easing the burden of state information transfer between host computers and graphics accelerators.

SUMMARY

In one set of embodiments, a control unit in a graphics accelerator may be receive graphics commands corresponding to multiple processes running on one or more central processing units as follows. The control unit may include a plurality of processing pipelines, a memory (configured to store an allocation table) and a context management unit. The context management unit may be configured to: (a) receive a graphics command, (b) decode a process identifier from input data (e.g., from data provided in or with the graphics command), wherein the process identifier corresponds to one of a plurality of host processes executing on one or more central processing units external to the graphics accelerator, and (c) identify an entry E in the allocation table that corresponds to the process identifier. In response to the validity of a first set of conditions, the context management unit may: (d) reassign ownership of a first of the processing pipelines from a first active entry of the allocation table to the entry E, and (e) send the graphics command to the first processing pipeline. The first set of conditions may include a first condition that the entry E is inactive and a second condition that there are no unclaimed processing pipelines.

Alternatively, the context management unit may send the graphics command to a second processing pipeline designated by a pipeline list in the entry E and not perform (d) or (e) in response to a determination that the entry E is active. In response to a determination that the entry E is inactive and that there is at least one unclaimed processing pipeline among the plurality of processing pipelines, the context management unit may assign ownership of a first of the unclaimed processing pipelines to the entry E and not perform (d) or (e).

The context management unit may reassign ownership of the first processing pipeline from the first active entry to the entry E by removing a numeric designator corresponding to the first processing pipeline from a list in the first active entry and adding said numeric designator to a list in the entry E.

In one embodiment, the context management unit is further configured to select the first active entry from among a plurality of active entries in the allocation table on a least recently used basis.

Each of the plurality of processing pipelines may include a direct memory access controller, a data format converter, and a vertex processing unit (configured to subdivide vertex chains).

BRIEF DESCRIPTION OF THE DRAWINGS

A better understanding of the present invention can be obtained when the following detailed description is considered in conjunction with the following drawings, in which.

Figure 1:
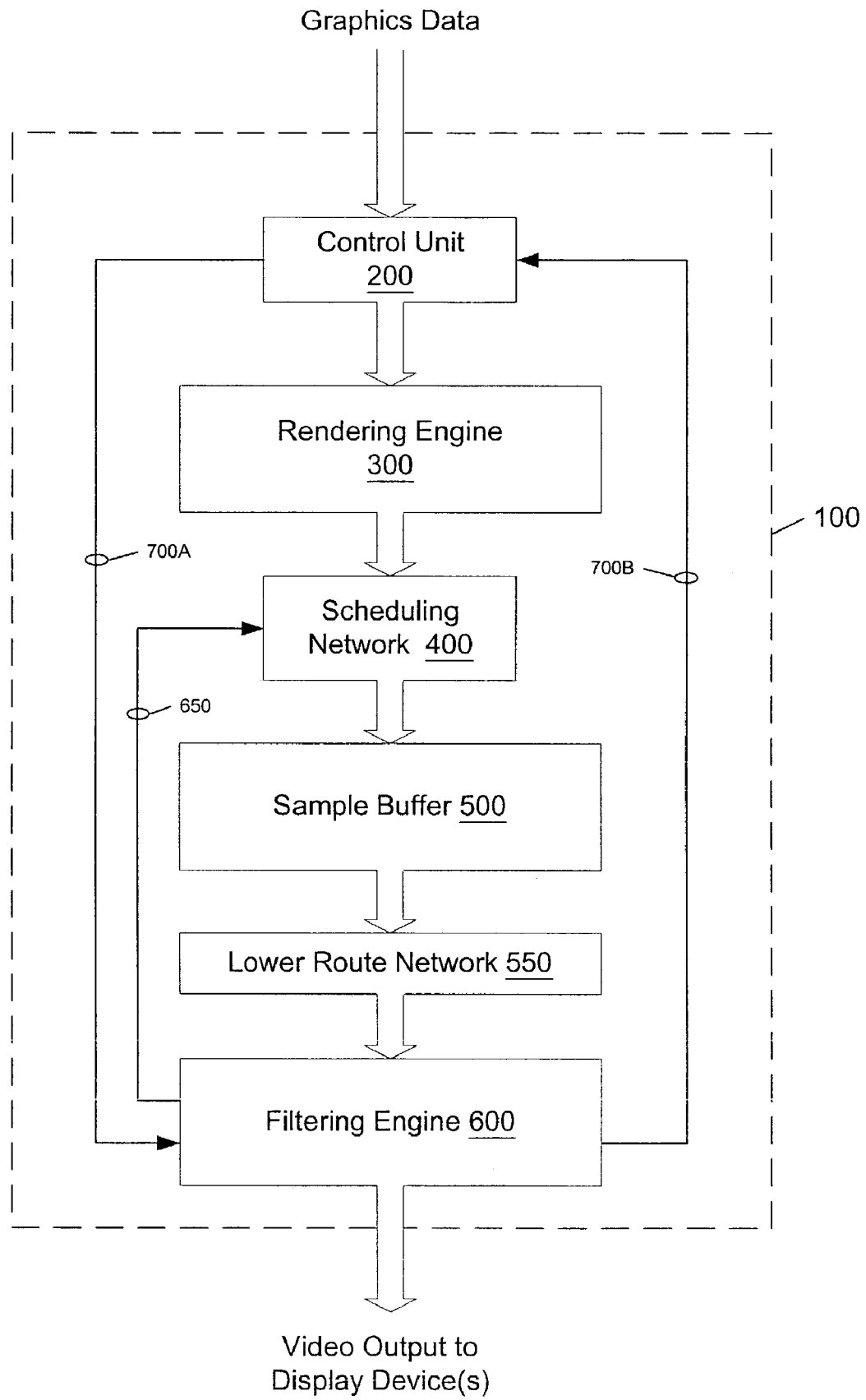
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
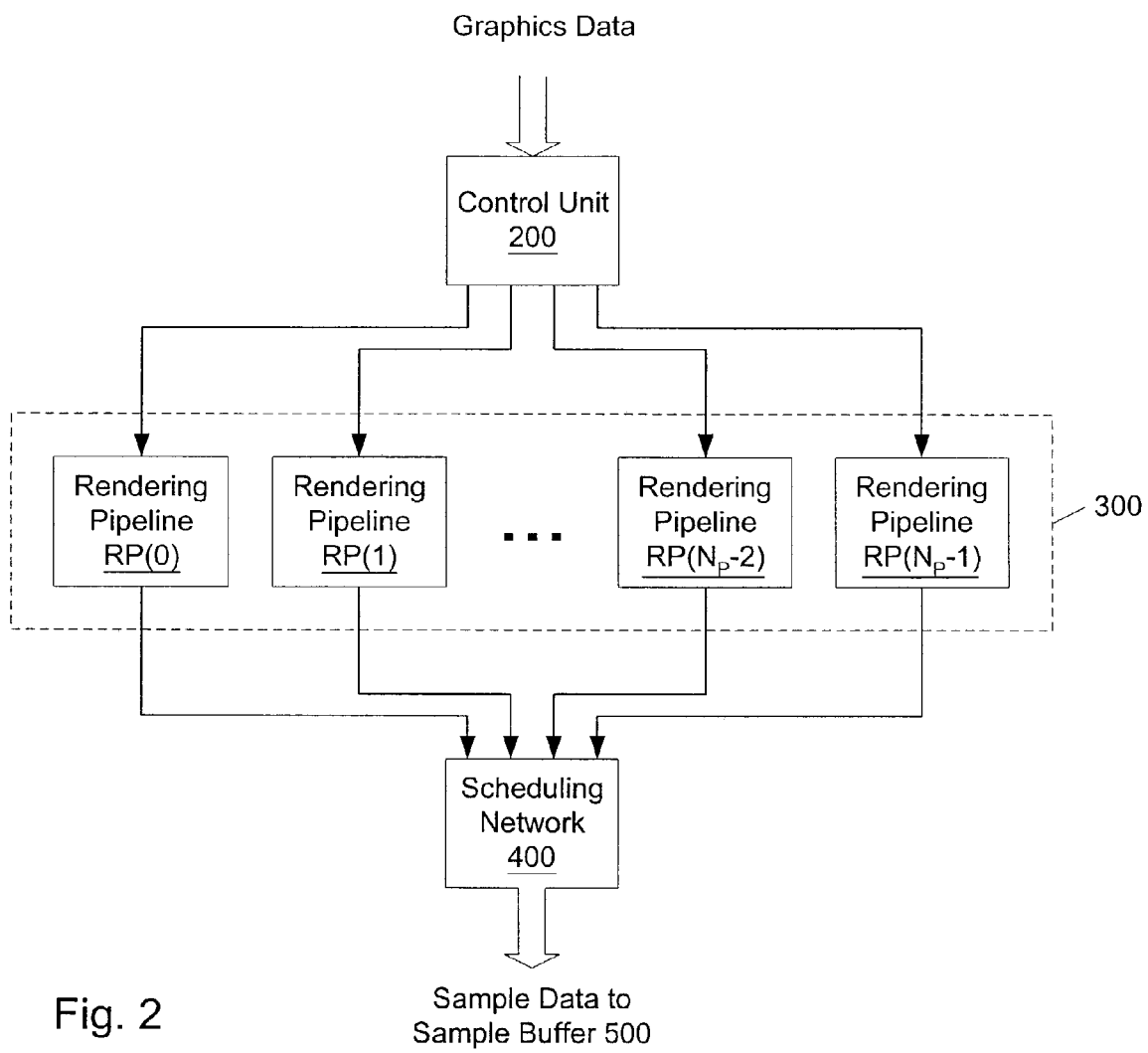
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$-1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), . . . , VPS($N_D$-1), where $N_D$ is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
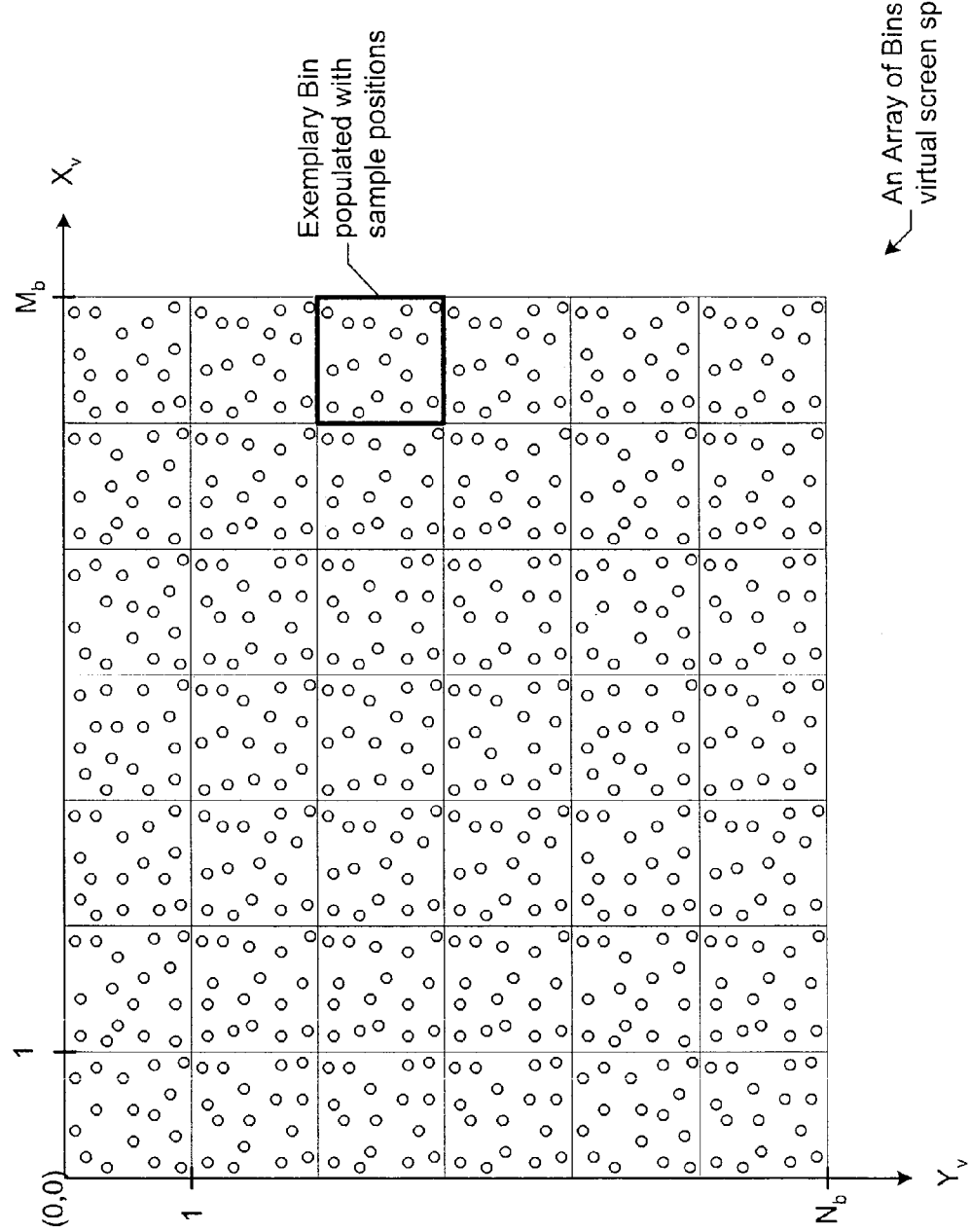
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
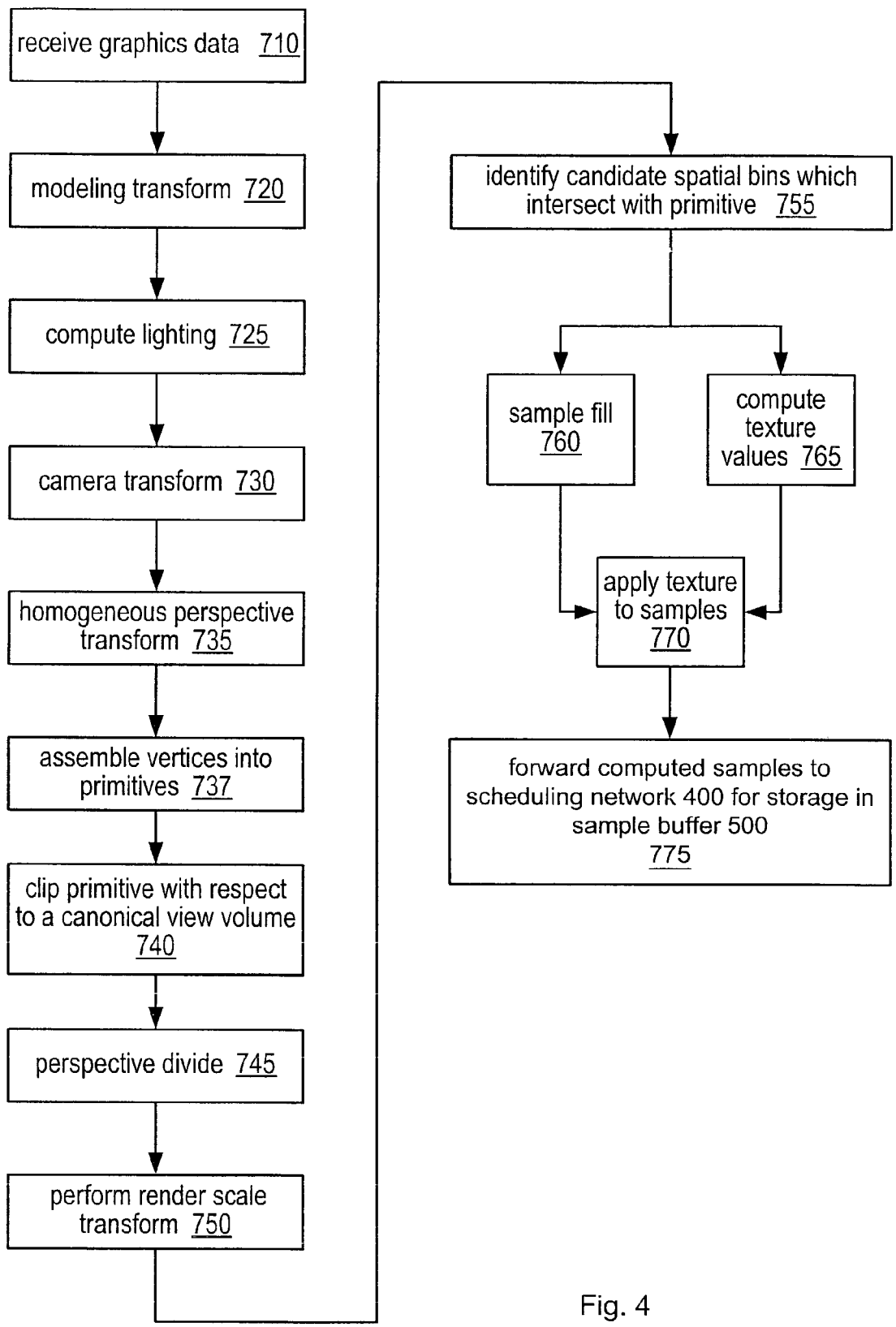
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

T1=$(-W \leq X)$
T2=$(X \leq W)$
T3=$(-W \leq Y)$
T4=$(Y \leq W)$
T5=$(-W \leq Z)$
T6=$(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations x=X/W
y=Y/W
z=Z/W.

After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
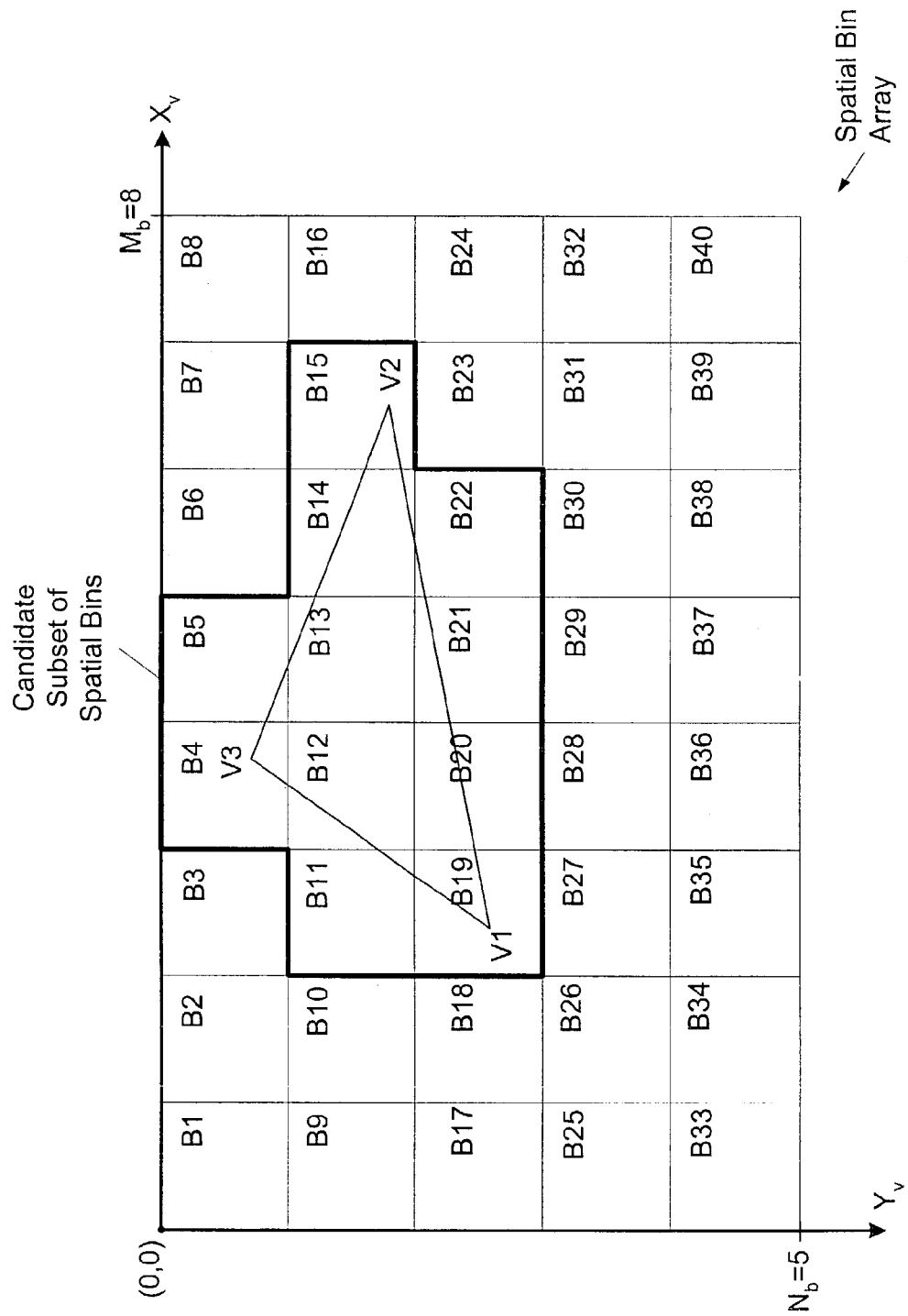
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
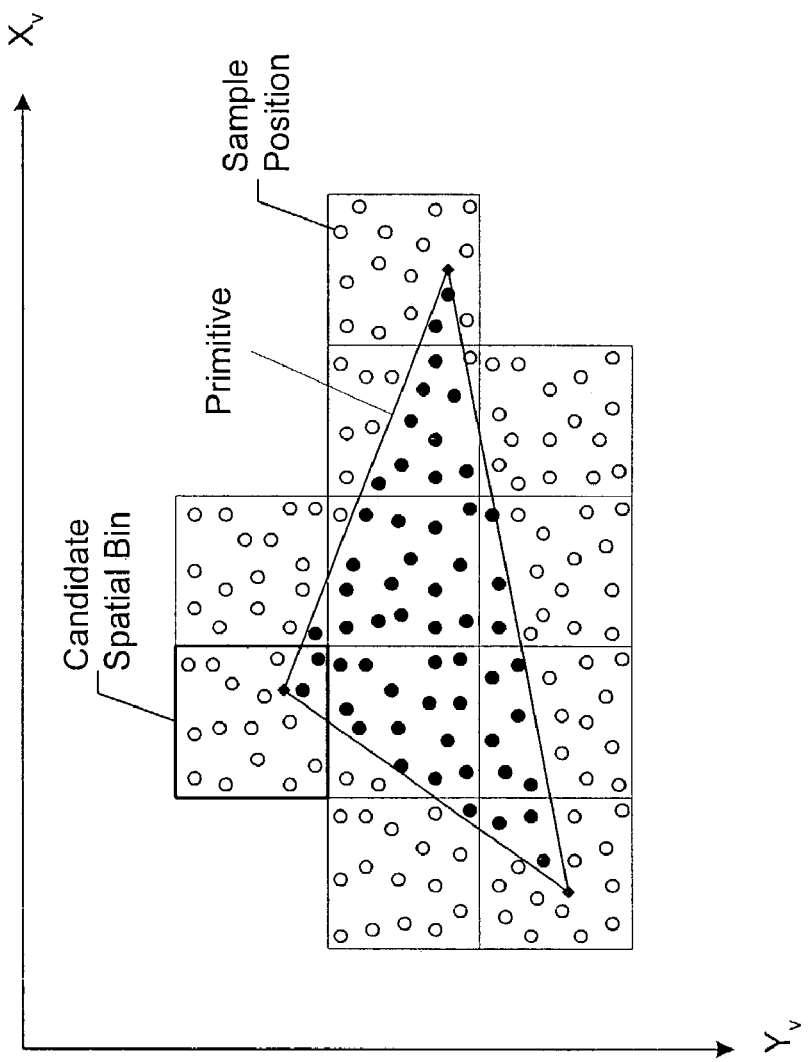
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
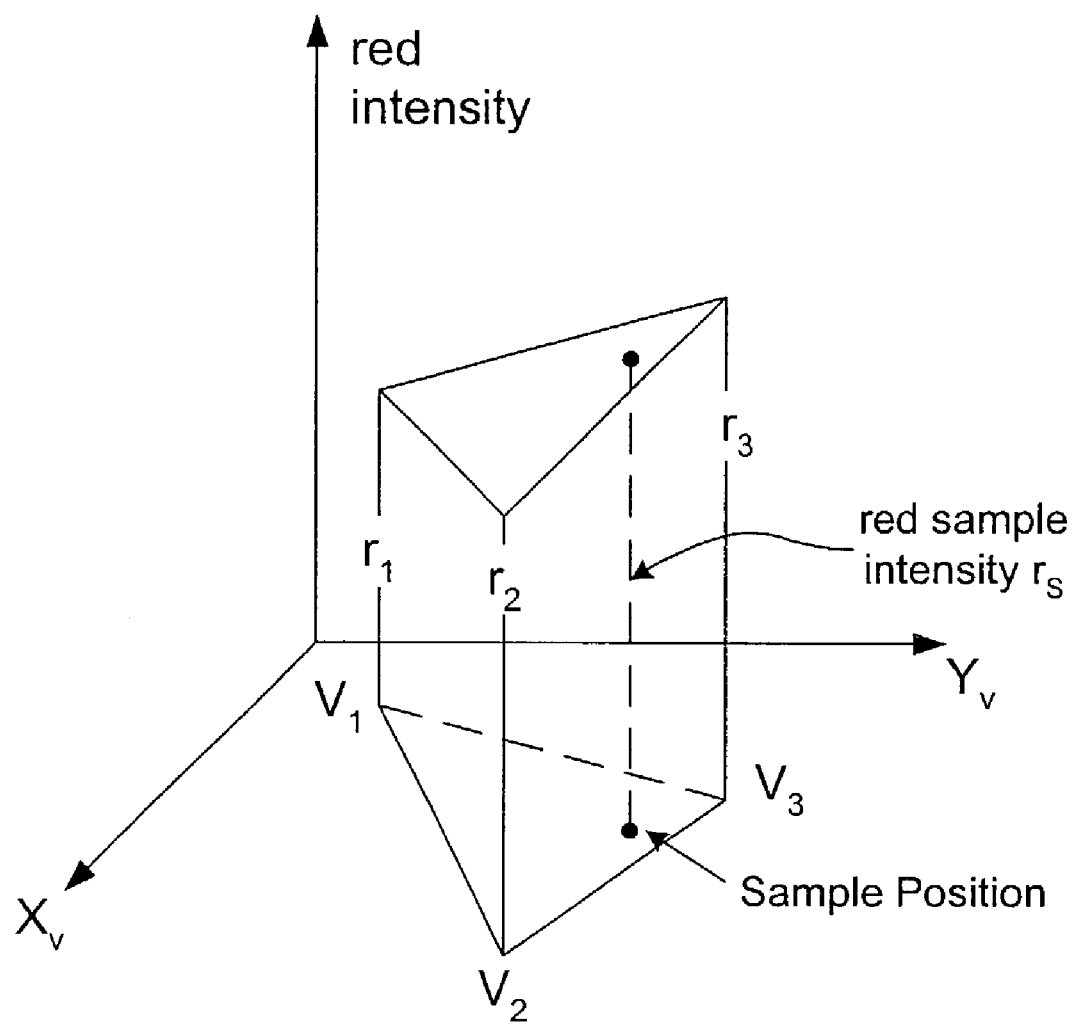
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
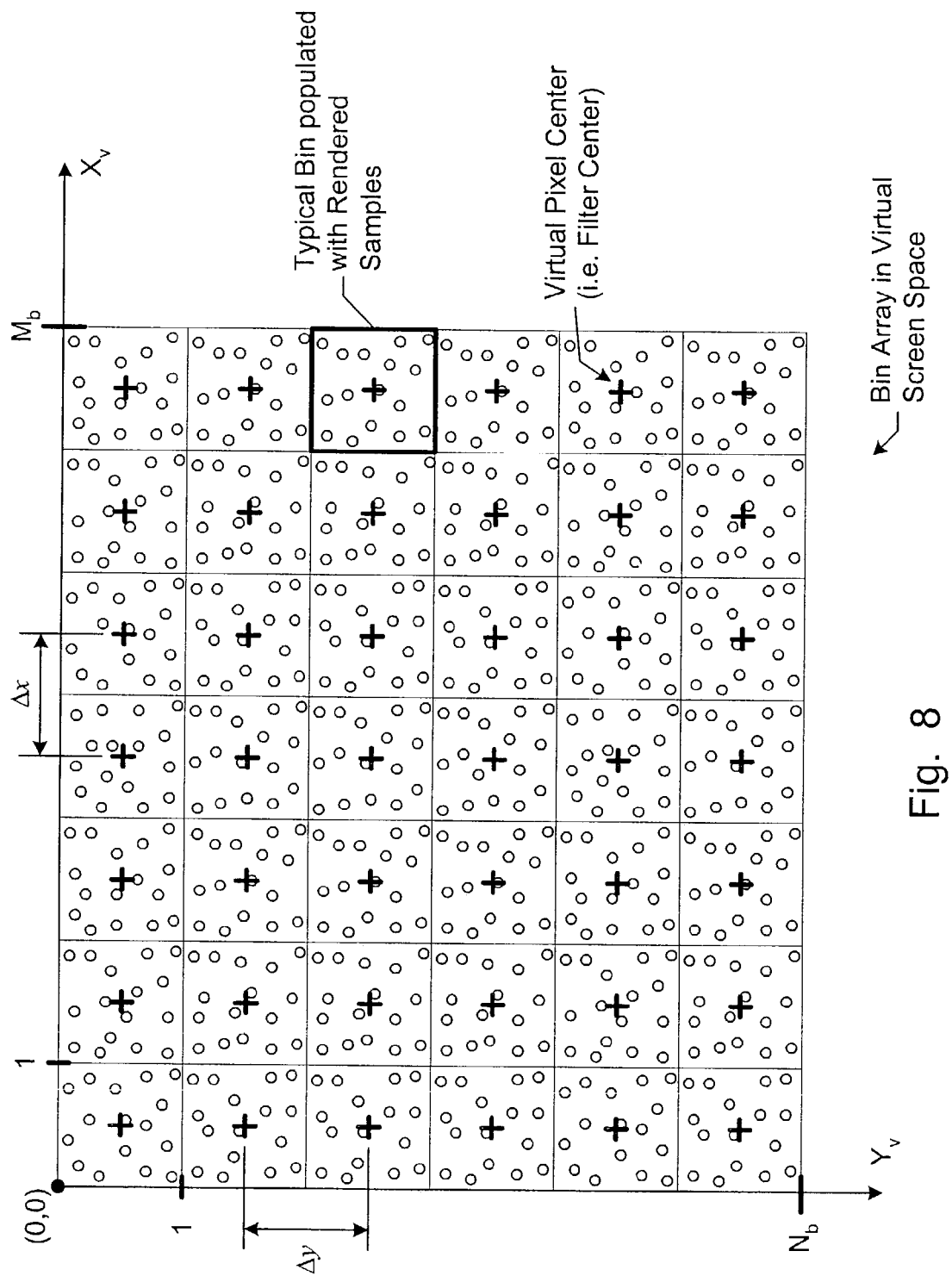
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement ΔX between successive virtual pixel positions in a row and vertical displacement ΔY between successive rows. The first virtual pixel position in the first row is controlled by a start position ($X_{start}$, $Y_{start}$). The horizontal displacement ΔX, vertical displacement ΔY and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement Δx and vertical displacement Δy may be assigned values greater than or less than one. Furthermore, the start position ($X_{start}$, $Y_{start}$) is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
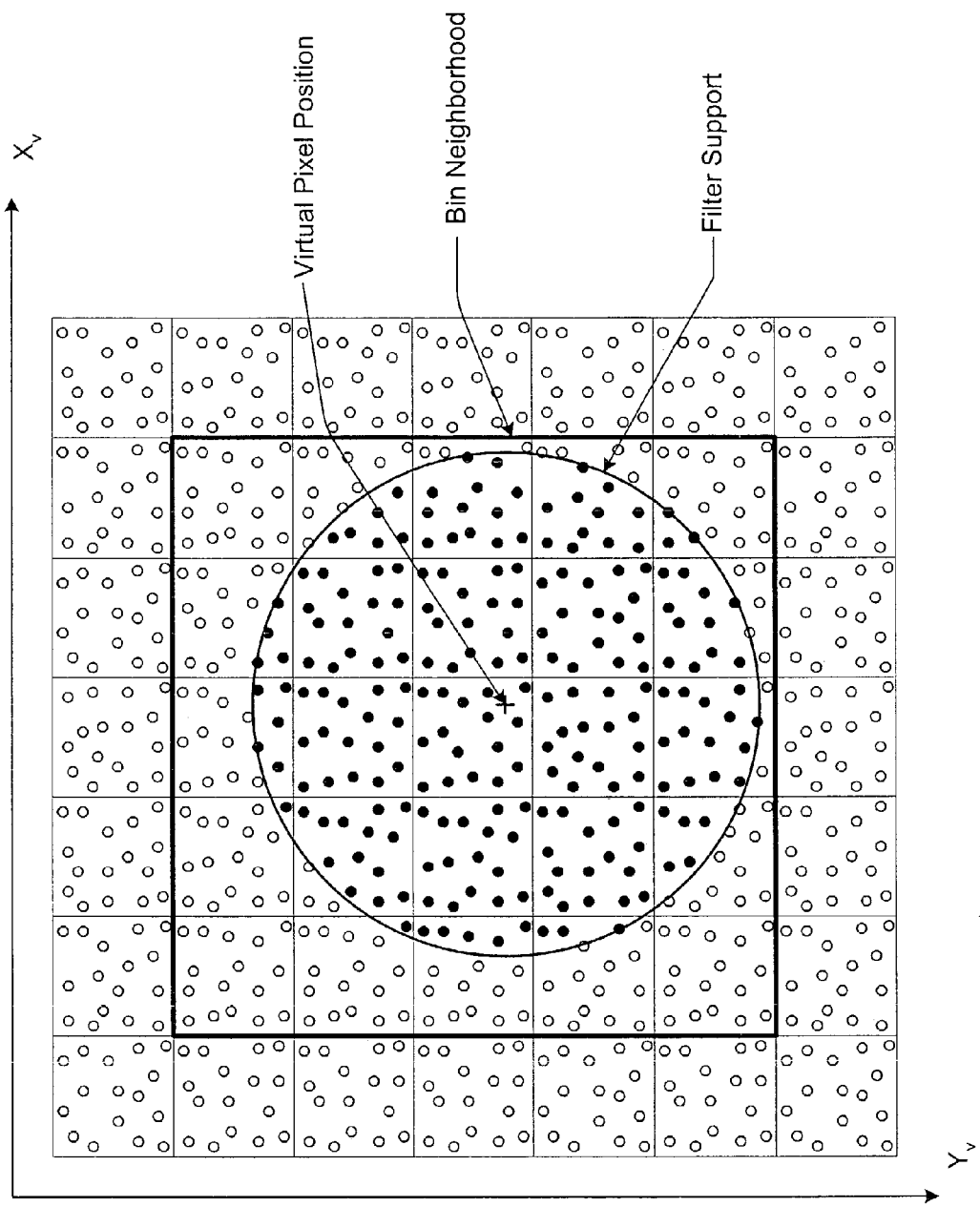
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position ($X_S$, $Y_S$) in the bin neighborhood with respect to the virtual pixel position ($X_P$, $Y_P$) according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_s = (D_s)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P+R_f$, $X_P-R_f$, $Y_P+R_f$, and $Y_P-R_f$. Each sample S in the bin neighborhood may be marked as being valid if the sample's position $(X_S, Y_S)$ falls within the support square, i.e., if $$X_P-R_f<X_S<X_P+R_f \text{ and}$$

$$Y_P-R_f<Y_S<Y_P+R_f.$$

Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sine filter, or in general, any form of band pass filter or any of various approximations to the sine filter.

In one set of embodiments, the filtering engine 600 may include a set of filtering units FU(0), FU(1), FU(2), . . . , FU($N_{f-1}$) operating in parallel, where the number $N_f$ of filtering units is a positive integer. For example, in one embodiment, $N_f=4$. In another embodiment, $N_f=8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f=4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_p=X_start(K);
Y_p=Y_start(K);
while (J<N_p) {
```

-continued

```
    while (I < M_H(K)) {
        PixelValues = Filtration(X_p,Y_p);
        Send PixelValues to Output Buffer;
        X_p = X_p+ΔX(K);
        I = I + 1;
        }
    X_p=X_start(K)
    Y_p=Y_p+ΔY(K);
    J=J+1;
    }
```

The expression Filtration($X_P, Y_P$) represents the filtration of samples in the filter support region of the current virtual pixel position ($X_P, Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
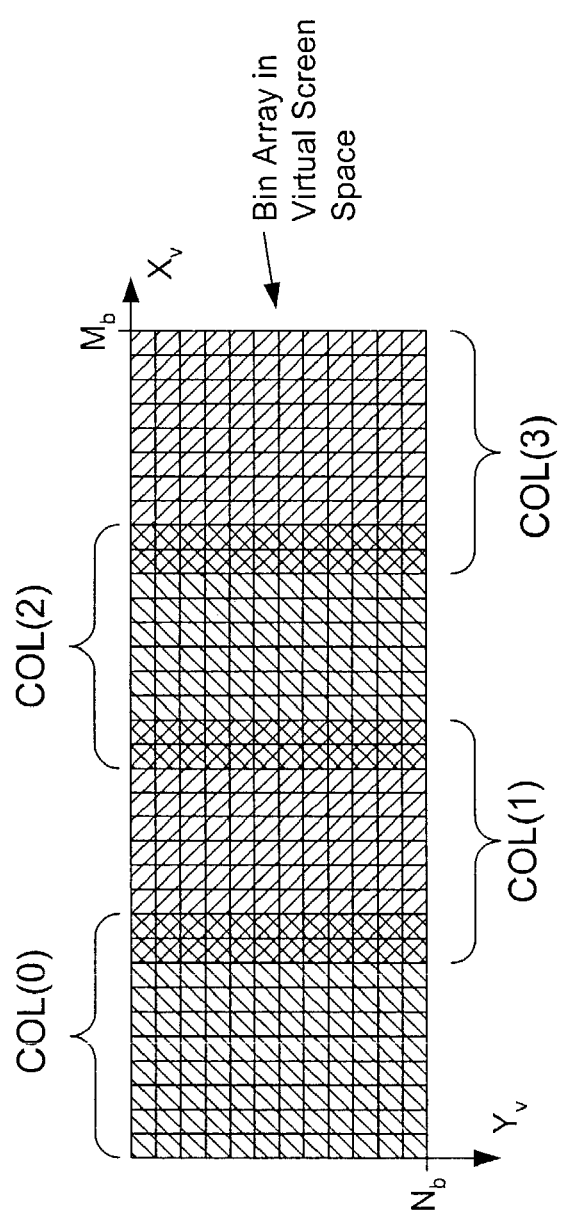
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
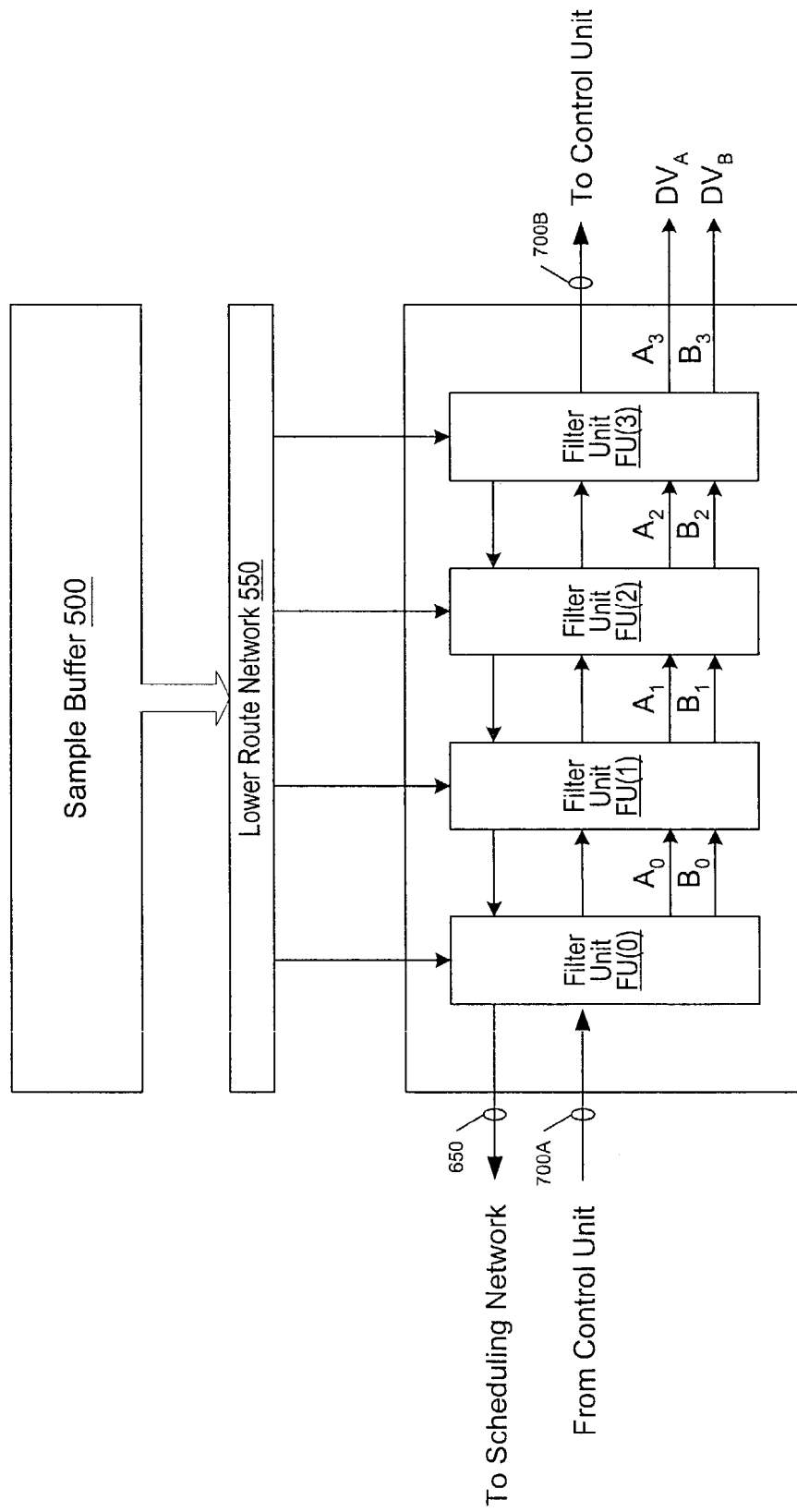
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$-1), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$-1) receives digital video streams $A_{Nf-2}$ and $B_{Nf-2}$ from the previous filtering unit FU($N_f$-2), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{NF-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$ or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
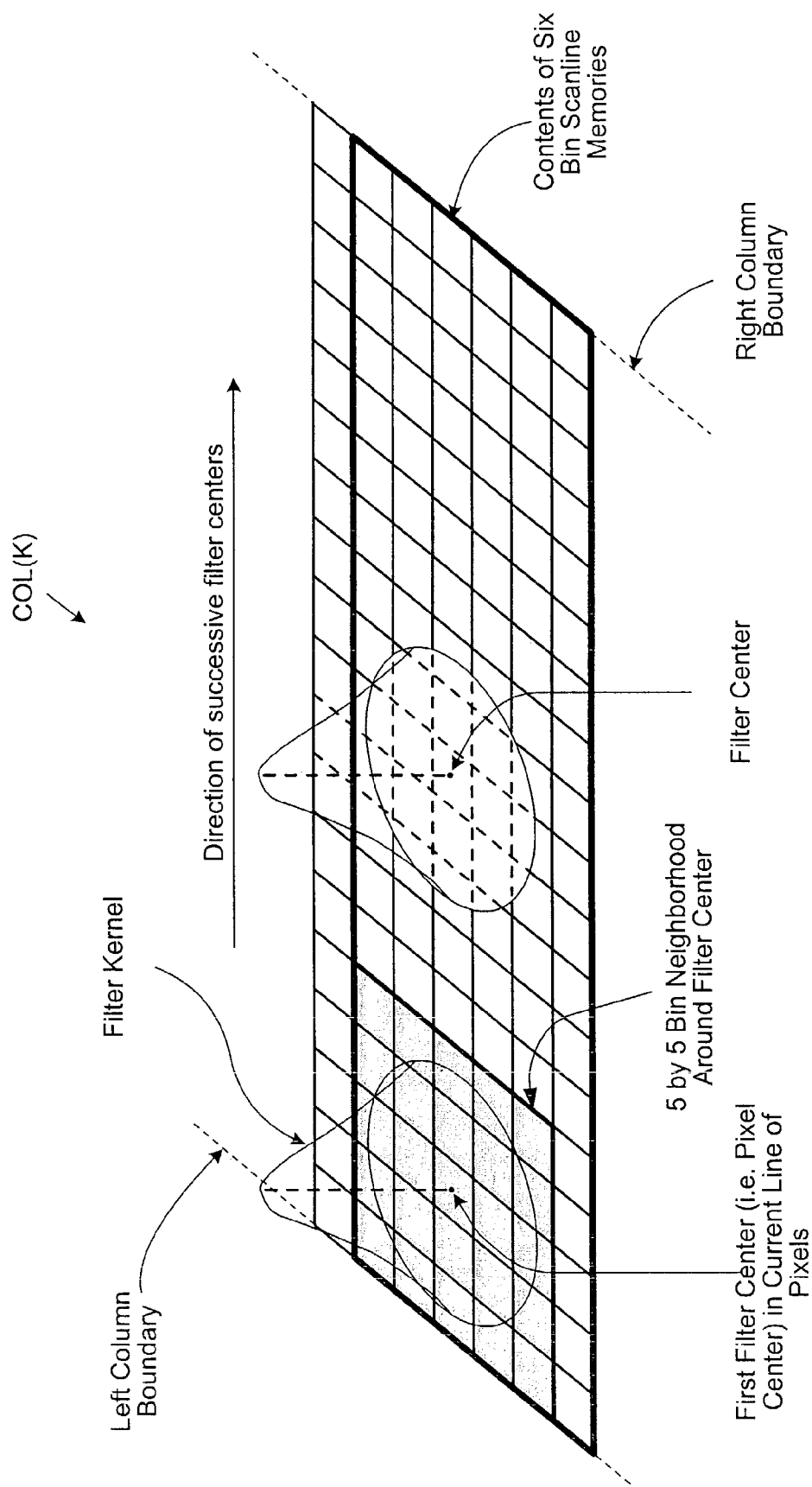
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J*N_J*D_{max}$ vector displacements to support the tile of bins. Host software may load the jitter table with a pseudo-random pattern of vector displacements to induce a pseudo-random pattern of sample positions. In one embodiment, $M_J=N_J=2$ and $D_{max}=16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), ..., MB($N_{MB}-1$), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:
- 30 bits of sample color (for front buffer),
- 30 bits of sample color (for back buffer),
- 16 bits of alpha and/or overlay,
- 10 bits of window ID,
- 26 bits of z depth, and
- 4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
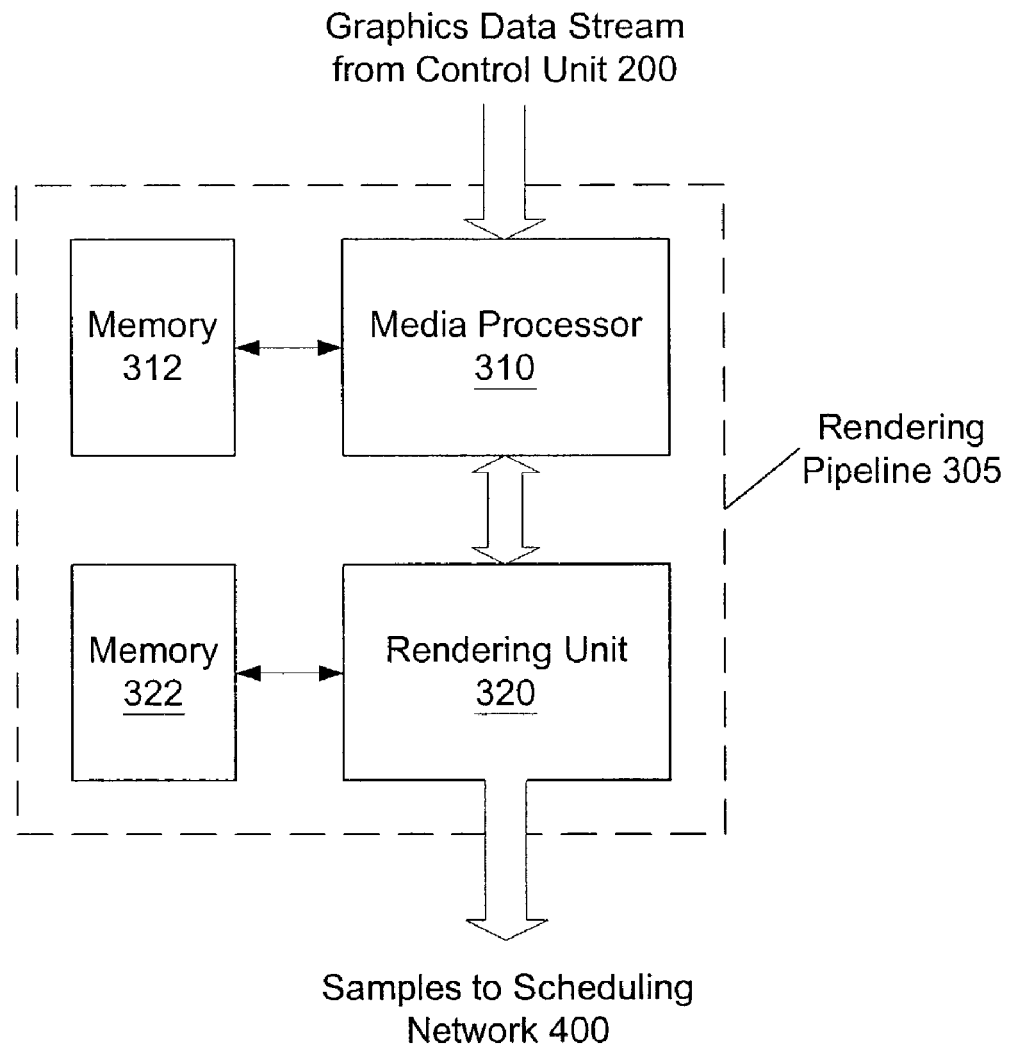
FIG. 13 illustrates one set of embodiments of a rendering pipeline comprising a media processor and a rendering unit.

As described above, the rendering engine 300 may include a set of rendering pipelines RP(0), RP(1), . . . , RP($N_{PL}$−1). FIG. 13 illustrates one embodiment of a rendering pipeline 305 that may be used to implement each of the rendering pipelines RP(0), RP(1), . . . , RP($N_{PL}$−1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
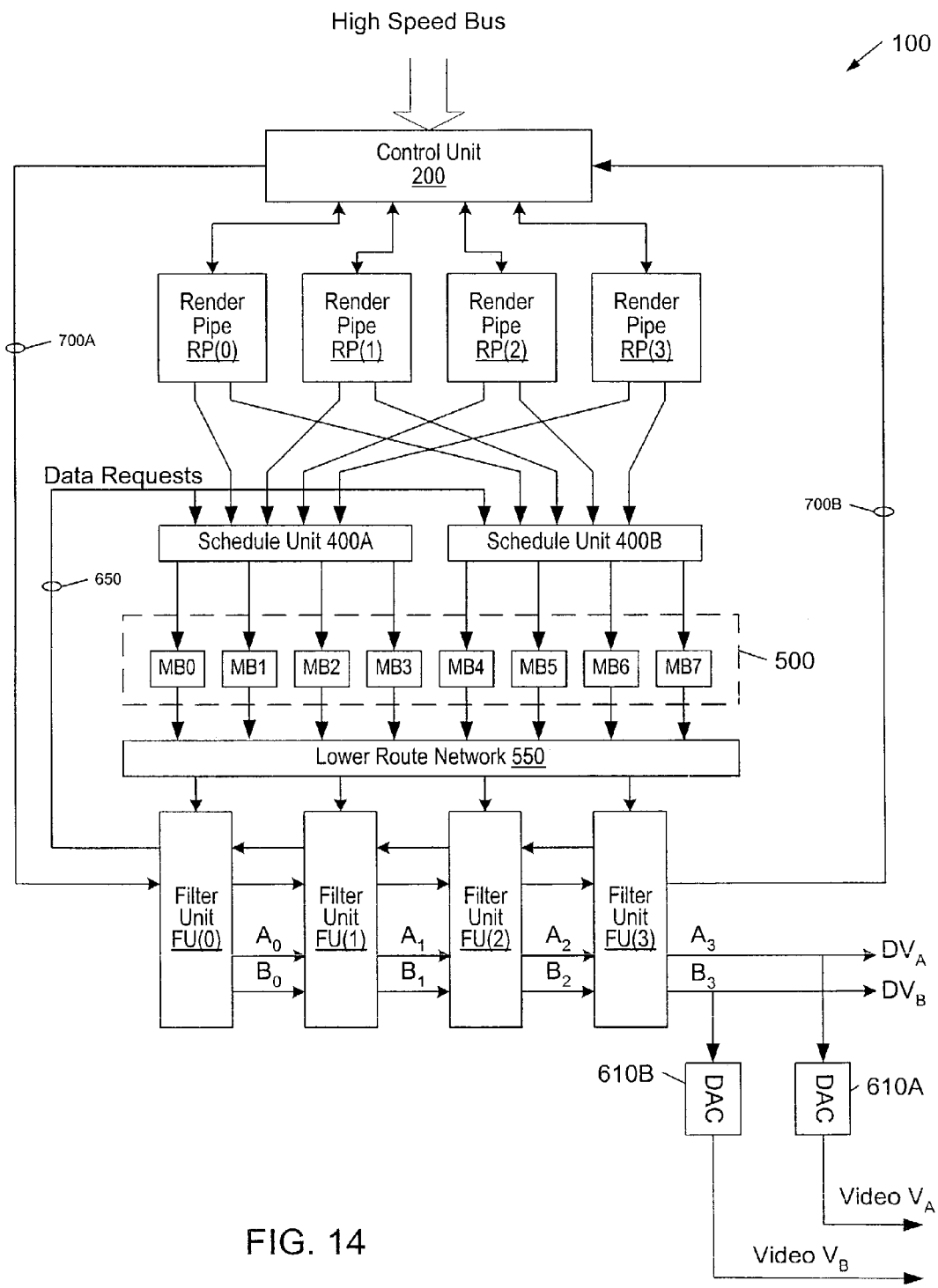
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
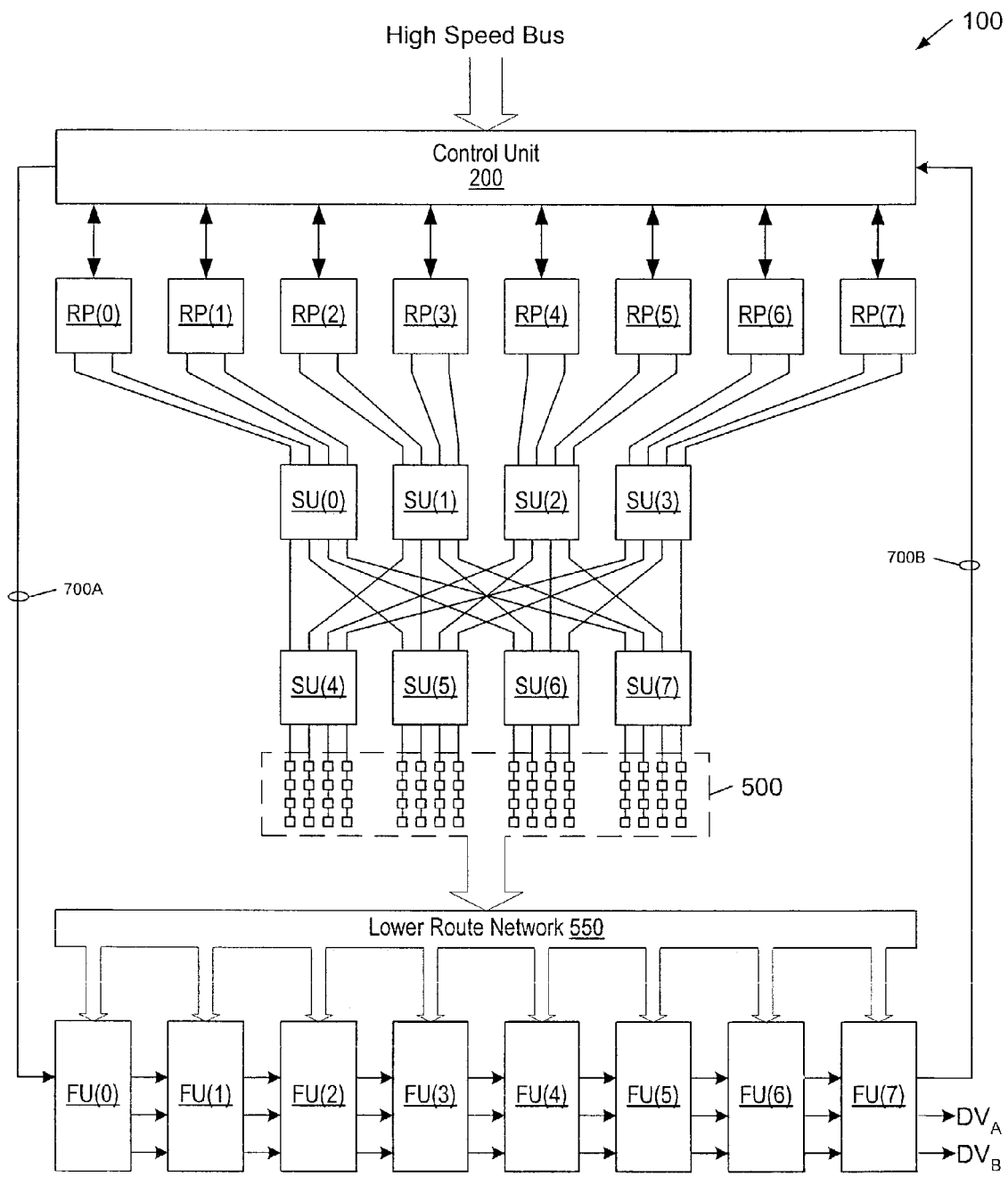
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Context Switching to Support Multiple Processes

Figure 16:
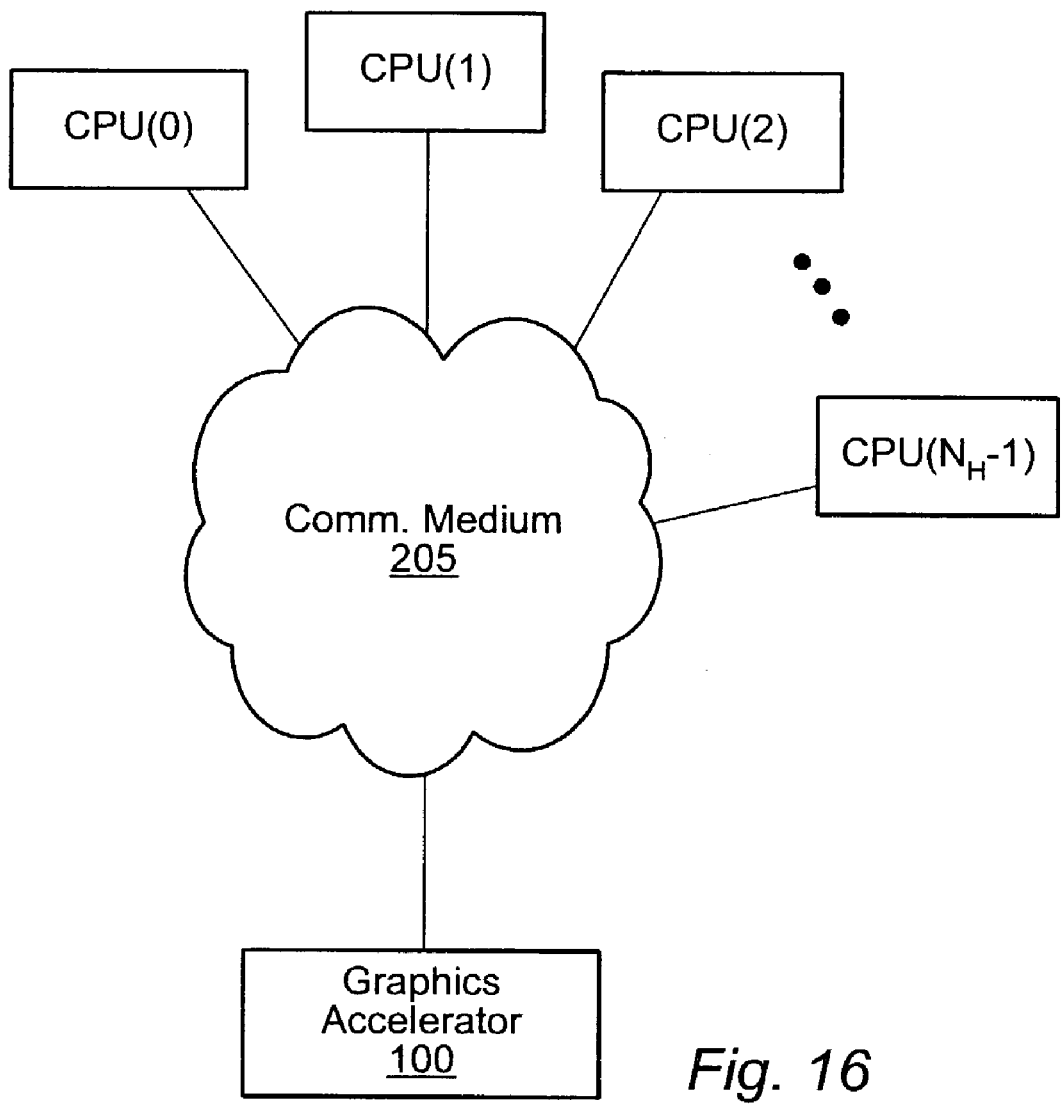
FIG. 16 illustrates a set of central processing units coupled a graphics accelerator through a communication medium.

Graphics accelerator 100 may be configured to service a set of $N_H$ central processing units (CPUs) denoted CPU(0), CPU(1), CPU(2), . . . , CPU($N_H$−1), where $N_H$ is a positive integer, as suggested by FIG. 16. The central processing units may couple to the graphics accelerator through a communication medium 205 (e.g., a computer network). In one embodiment, one or more of the central processing units may be integrated as part of a multiprocessor computer system.

Each of the central processing units CPU(0), CPU(1), CPU(2), . . . , CPU($N_H$−1) may execute one or more processes (referred to henceforth as host processes) requiring the services of graphics accelerator 100. Each such host process may send (or, initiate the transfer of) graphics commands (or data) to the graphics accelerator. In response to such commands, the graphics accelerator 100 performs rendering operations resulting in the display of video frames on a display device (or a set of display devices).

To most conveniently work with existing computers without unduly adding to their design complexity, it is common for graphics accelerator subsystems to appear as specialized memory to the host computer system. Thus, commands to graphics accelerators can be implemented from the host computer's point of view by normal write transactions to this specialized memory. In a multiprocessor system, the normal write transaction may include information about the processor ID and/or process ID that originated the write transaction.

Besides appearing as memory, there are other ways to attach graphics subsystems. The term "graphics command" is used herein to describe not only these memory transactions but also these other ways of communicating to the graphics accelerator.

Figure 17:
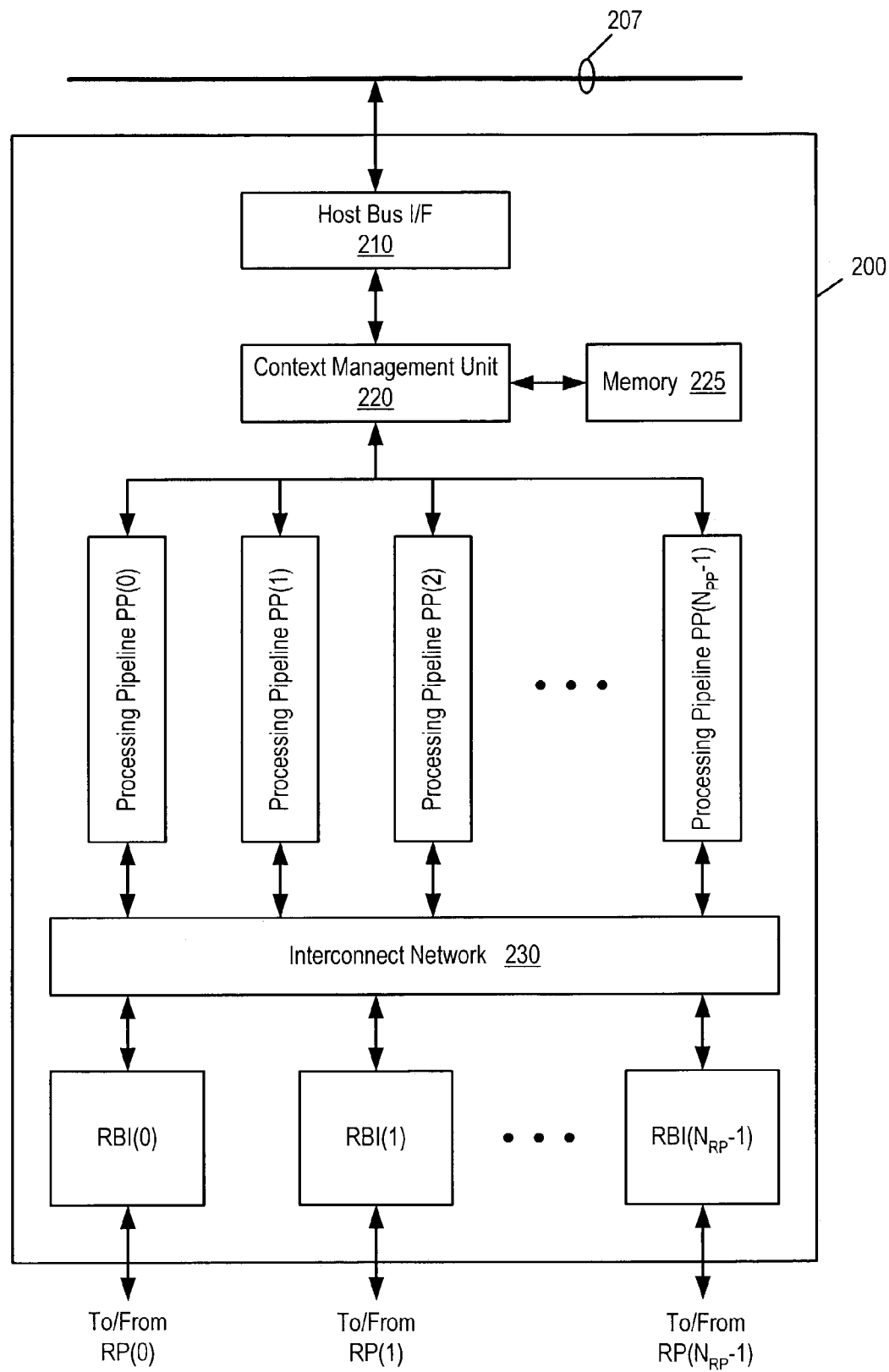
FIG. 17 illustrates one embodiment of control unit 200.

In one set of embodiments, control unit 200 may include a host bus interface 210, a context management unit 220, a memory 225, a set of $N_{PP}$ processing pipelines denoted PP(0), PP(1), PP(2), . . . , PP($N_{PP}$−1), where $N_{PP}$ is a positive integer, an interconnection network 230, and a set of render bus interfaces denoted RBI(0), RBI(1), RBI(2), . . . , RBI($N_{RP}$−1) as suggested in FIG. 17. Note that the number of render bus interfaces equals $N_{RP}$ (i.e., the number of rendering pipelines) as each render bus interface RBI(K) couples to a corresponding rendering pipeline RP(K) through a corresponding bus connection.

The host bus interface 210 is configured for coupling to communication medium 205 (e.g., to an external bus 207). The host bus interface 210 may receive graphics commands from the central processing units in response to execution of the host processes on the central processing units. Some of these graphics commands may be commands directing the control unit 200 to perform DMA transfers to and/or from external memories (e.g., system memories associated with the central processing units). Thus, the host bus interface 210 may also receive graphics commands from the external memories in response to DMA transfers initiated by DMA engines in the processing pipelines (or, in one embodiment, by a centralized DMA engine that serves each of the processing pipelines). The host bus interface 210 forwards the graphics commands to the context management unit. (DMA is an acronym for the term "direct memory access".)

The context management unit 220 includes an address decoder. The address decoder may operate on input data (e.g., one or more data fields) provided in or with the graphics command to determine a process identifier. The process identifier specifies which of the host processes originated the graphics command. In one embodiment, the input data is an address component provided in or with the graphics command. In another embodiment, the input data is a subset of bits in the address component. In yet another embodiment, the input data may include (a) a processor tag specifying a particular one of the CPUs and (b) a process tag specifying a process executing on the particular CPU. A wide variety of embodiments are contemplated for the form of input data.

The context management unit 220 may search an allocation table stored in memory 225 using the process identifier to determine if the originating process currently owns one or more of the processing pipelines PP(0), PP(1), PP(2), ..., PP($N_{PP}$–1). If the allocation table indicates that the originating process currently owns a nonempty subset of the processing pipelines, the context management unit 220 may forward the graphics command to one or more of the processing pipelines of the nonempty subset. A stream of commands associated with the originating process may be distributed to the processing pipelines of the nonempty subset in a round-robin fashion, or, more generally, according to any desired distribution policy.

If the originating process does not currently own any of the processing pipelines, the context management table may determine if there any are any unclaimed processing pipelines, i.e., any processing pipelines that are not currently owned by any host process. If there exists at least one unclaimed processing pipeline, the context management unit 220 may update the allocation table so as to assign ownership of one or more of the unclaimed processing pipelines to the originating process.

If there are no unclaimed processing pipelines, the context management unit may:

(a) liberate (i.e., withdraw the ownership of) one or more processing pipelines from one or more of the processes indicated (by the allocation table) as currently owning processing pipelines;

(b) save the context (i.e., the state of various programmable registers) of the liberated pipelines in the allocation table;

(c) assign ownership of the one or more liberated processing pipelines to the originating process;

(d) load context information corresponding to the originating process into the assigned processing pipelines; and (e) send the graphics command to one or more of the assigned processing pipelines.

Processing pipelines may be liberated according to a "least recently used" policy. In other words, processing pipelines that have been least recently used may be liberated first. More generally, any of a wide variety of algorithms may be employed to determine the selection order for liberating processing pipelines.

If, in the act of liberating one or more processing pipelines for the sake of the originating process, any process X has all of its assigned processing pipelines liberated, the process X may be marked as inactive.

Each processing pipeline PP(K), K=0, 1, 2, ..., $N_{PP}$–1, is configured to receive a stream of graphics data (e.g., vertex data) corresponding to a host process, i.e., the host process that currently owns the processing pipeline PP(K), and operate on the stream of graphics data. The results of said operating are forwarded to one or more of the rendering pipelines RP(0), RP(1), ..., RP($N_{RP}$–1) through the interconnect network 230 and render bus interfaces RBI(0), RBI(1), ..., RBI($N_{RP}$–1).

Figure 18:
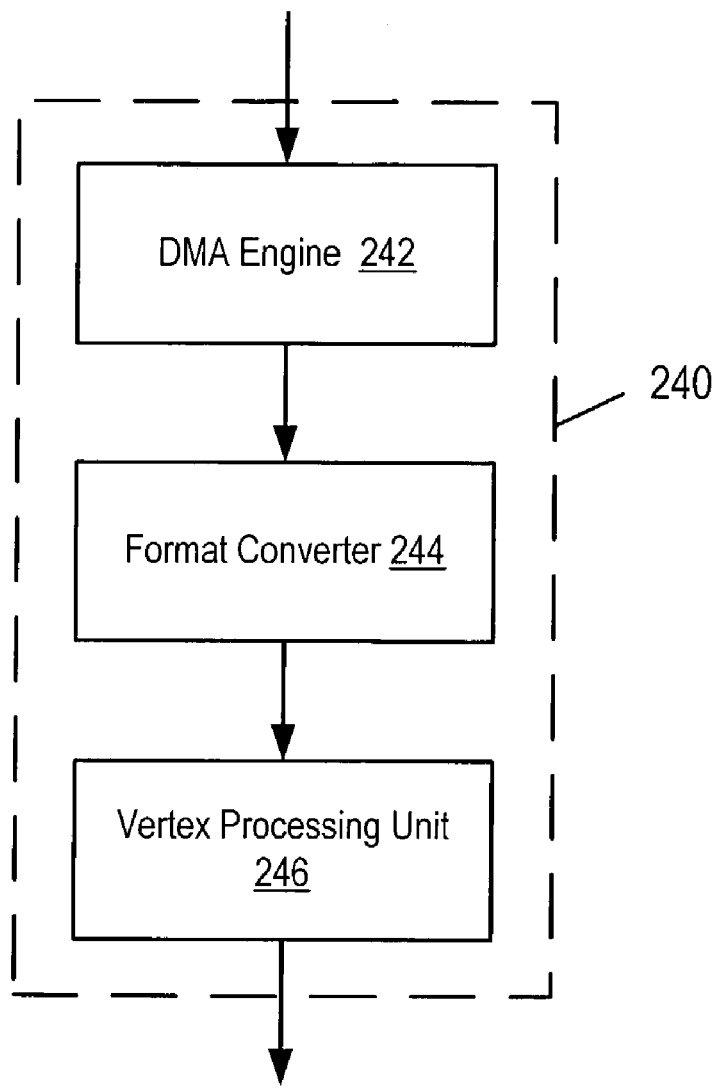
FIG. 18 illustrates one embodiment of a processing pipeline 240.

FIG. 18 illustrates one embodiment 240 for a processing pipeline, e.g., for any or all of processing pipelines PP(0), PP(1), PP(2), ..., PP($N_{PP}$–1). The processing pipeline 240 may include a DMA engine 242 (e.g., a DMA controller), a format converter 244 and a vertex processing unit 246. DMA is an acronym for "direct memory access".

The DMA engine 242 controls direct memory access transfers for the processing pipeline 240. Graphics commands may include a variety of different types of instructions. For example, a DMA transfer instruction may be an example of a graphics command. A DMA transfer instruction may specify sufficient information to define a DMA transfer from a source memory to a destination memory. A typical DMA transfer instruction may induce a DMA transfer of data from an external memory (e.g., a system memory associated with one of the central processing units) to a memory internal to graphics accelerator 100, or vice versa. For example, a DMA transfer may be used to supply data to a buffer resident in format converter 244).

The format converter 244 is responsible for converting graphics data into an internal format, or, into one of a set of internal formats depending on the type of graphics data.

The vertex processing unit handles the subdivision of vertex chains. A single processing pipeline may be serviced by one or more rendering pipelines RP(0), RP(1), RP(2), ..., RP($N_{RP}$–1). For example, a single processing pipeline may send its vertex data to one or more of the rendering pipelines. In the "more than one" case, long vertex chains may be subdivided into sub-chains, and the sub-chains may be distributed among the more than one rendering pipelines to exploit the parallelism of the rendering pipelines.

The context management unit 220 may include DMA arbitration logic to arbitrate between the transaction requests asserted by the DMA engines DMA(0), DMA(1), DMA(2), ..., DMA($N_{PP}$–1) in the corresponding processing pipelines PP(0), PP(1), PP(2), ... PP($N_{PP}$–1). The DMA arbitration logic controls which DMA engine gets access to the communication medium 205 at any given time, i.e., which DMA engine is selected to have its transactions asserted onto the communication medium 205. Any graphics command received from an external memory in response to a DMA transfer may bypass the decode process which determines process IDs. Such graphics commands may be forwarded to the originating DMA engine or to the processing pipeline of the originating DMA engine. The process ID determination is not needed for graphics commands arriving in response to DMA transactions.

Interconnect network may be configured to transfer data between any of the processing pipelines PP(J), J=0, 1, 2, ..., $N_{PP}$-1, and any of the render bus interfaces RBI(K), K=0, 1, 2, ..., $N_{RP}$-1. Interconnect network may be configured to transfer data from all the processing pipelines PP(0), PP(1), PP(2), ..., PP($N_{PP}$-1) to their corresponding destinations in parallel.

Render bus interface RBI(K), K=0, 1, 2, ..., $N_{RP}$-1, controls the transfer of data between interconnect network 230 and the corresponding render pipeline RP(K).

In one embodiment, the context management unit 220 sends a token down a processing pipeline PP(K) after having selected it for liberation from a current process Y, stops supplying the processing pipeline PP(K) with data associated with process Y, and waits until the token arrives at interconnect network 230 before assigning ownership of the processing pipeline PP(K) to the originating process. The detection of the token at the interconnect network 230 indicates that processing pipeline PP(K) has completed processing of all data associated with the process Y up to the stopping point.

In some embodiments, the allocation table may include storage for a plurality of entries. Each entry may include a PID field for storing a process identifier (PID), a status flag, a list of processing pipelines, and a context data buffer. The process identifier specifies (or corresponds to) a host process executing on one of the central processing units CPU(0), CPU(1), CPU(2), ..., CPU($N_H$-1).

The status flag indicates whether the host process is active (i.e., currently owns one or more of the processing pipelines) or inactive (i.e., current owns none of the processing pipelines). If the host process is active, the list of processing pipelines specifies the processing pipelines currently owned by the host process. If the host process is inactive, the pipeline list may be empty; however, the context data buffer may include context information for the inactive host process.

Figure 19:
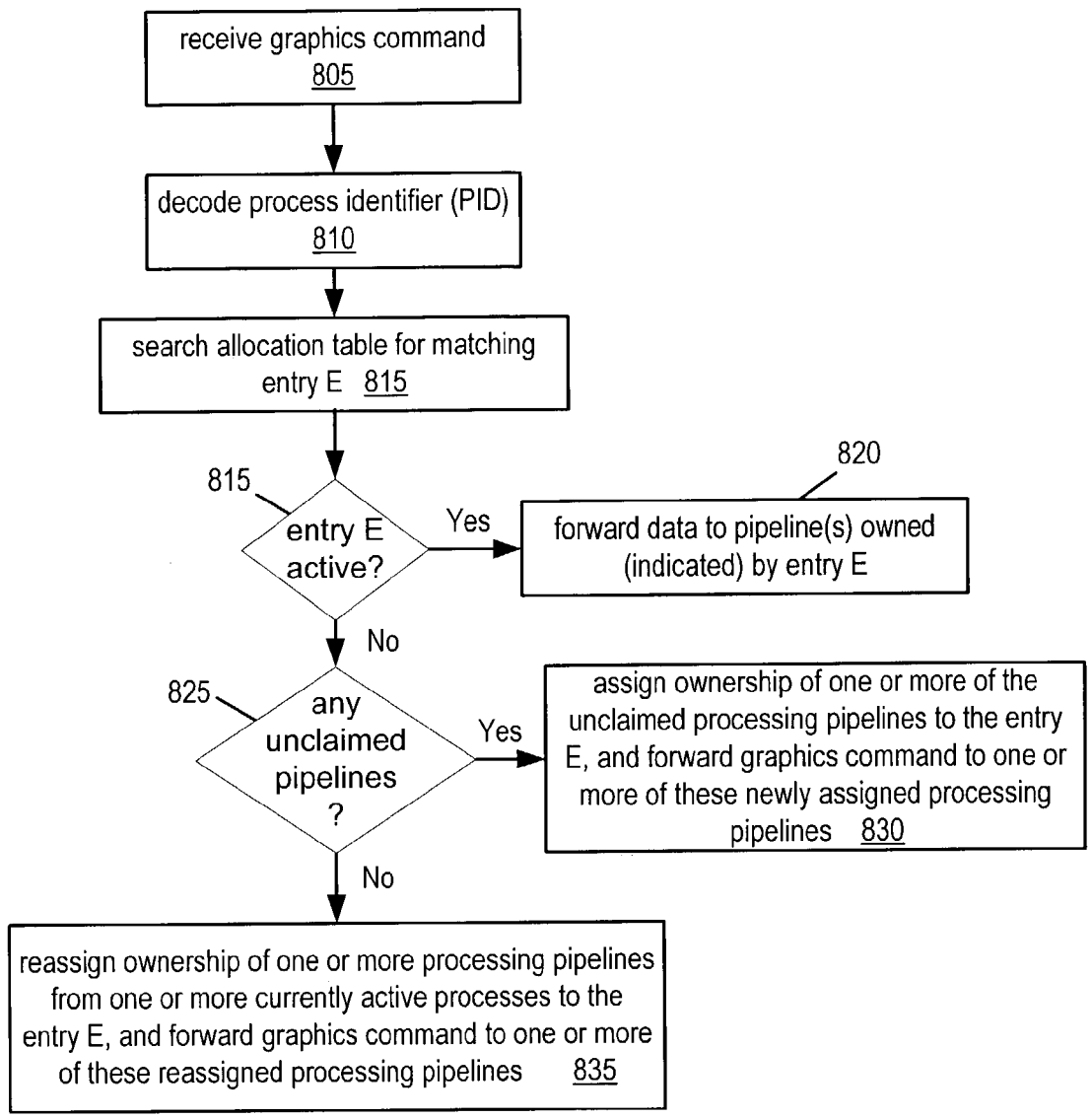
FIG. 19 illustrates one embodiment of a method for managing hardware context for multiple processing executing on the set of central processing units.

FIG. 19 illustrates one embodiment of a method for performing context management among a set of host processes executing on the central processing units CPU(0), CPU(1), ..., CPU($N_H$-1).

In step 805, the context management unit 220 may receive a graphics command from host bus interface 210. In step 810, the context management unit 220 may decode a process identifier from input data provided in or with the graphics command. The host process corresponding to the process identifier may be referred to as the requesting process.

In step 815, the context management unit 220 may search the allocation table to determine an entry E of the allocation table that contains the process identifier in its PID field. (The context management unit 220 may include dedicated circuitry to expedite the search process.) An entry is said to be active if its status flag equals a first value indicating the active state. Conversely, an entry is said to be inactive if its status flag equals a second value indicating the inactive state.

If the entry E is active, the context management unit 220 may forward the graphics command as indicated in step 820 to one or more of the processing pipelines listed in the active entry.

Conversely, if the entry E is inactive, the context management unit 220 may determine if any of the processing pipelines PP(0), PP(1), PP(2), ..., PP($N_{PP}$-1) are unclaimed by any host process (i.e., not currently assigned to any host process) as indicated in step 825. The context management unit 220 may maintain a list of unclaimed processing pipelines. If there is at least one unclaimed processing pipeline, the context management unit 220 may assign ownership of one or more of the unclaimed processing pipelines to the requesting process as indicated in step 830 by removing numeric designators corresponding to the one or more unclaimed pipelines from the unclaimed list, adding said numeric designators to the pipeline list of entry E, and setting the status flag for entry E to the active state. The context management unit 220 may then load context information from the context data buffer of entry E into the one or more newly assigned processing pipelines, and forward the graphics command to one or more of these newly assigned processing pipelines.

If there are no unclaimed processing pipelines, the context management unit 220 may select an active entry (or a set of active entries) from the allocation table and reassign ownership of one or more processing pipelines from the active entry to the entry E as indicated in step 835 by removing numeric designators corresponding to the one or more processing pipelines from the pipeline list of the active entry, adding these numeric designators to the pipeline list of entry E, and setting the status flag of the entry E to the active state. The context management unit 220 may then load context information from the context data buffer of entry E into the one or more reassigned processing pipelines, and forward the graphics command to one or more of these reassigned processing pipelines.

In step 835, active entries may be selected on the basis of a "least recently used" policy, or, any other desired selection policy.

As described above, control unit 200 has $N_{PP}$ physical processing pipelines. However, by enacting the context switching method of FIG. 19, context management unit 220 gives external hosts (e.g., software programs executing on the central processing units) the appearance that control unit 200 has more than $N_{PP}$ processing pipelines. The number $M_{PP}$ of "virtual" processing pipelines may be determined by factors such as the storage capacity of the allocation table.

As used herein the term graphics command may include vertex instructions, register read and/or write instructions, DMA transfer instructions, etc. Vertex instructions carry data describing one or more vertices.

Numerous variations and modifications will become apparent to those skilled in the art once the above disclosure is fully appreciated. It is intended that the following claims be interpreted to embrace all such variations and modifications.

What is claimed is:

1. A control unit for a graphics accelerator, the control unit comprising:
   a plurality of processing pipelines;
   a memory configured to store central processing unit information in an allocation table, wherein said information comprises process identifiers, and wherein each process identifier identifies a specific one of one or more central processing units external to the graphics accelerator and one of a plurality of processes executing on the specific one of the central processing units; and
   a context management unit configured to:
   (a) receive a graphics command comprising first input data;

(b) decode a process identifier from the first input data; and (c) identify an entry E in the allocation table that corresponds to the process identifier;

wherein, in response to a first condition, the context management unit is further configured to:

(d) reassign ownership of a first of the processing pipelines from a first active entry of the allocation table corresponding to the entry E, and (e) send the graphics command to the first processing pipeline.

2. The control unit of claim 1, wherein the context management unit is configured to perform (d) and (e) in response to the first condition that the entry E is inactive and that there are no unclaimed processing pipelines.

3. The control unit of claim 1, wherein the context management unit is configured to send the graphics command to a second processing pipeline designated by a pipeline list in the entry E and not perform (d) or (e) in response to a determination that the entry E is active.

4. The control unit of claim 1, wherein, in response to a determination that the entry E is inactive and that there is at least one unclaimed processing pipeline among the plurality of processing pipelines, the context management unit is configured to assign ownership of a first of the unclaimed processing pipelines to the entry E and not perform (d) or (e).

5. The control unit of claim 1, wherein the context management unit is configured to reassign ownership of the first processing pipeline from the first active entry to the entry E by removing a numeric designator corresponding to the first processing pipeline from a list in the first active entry and adding said numeric designator to a list in the entry E.

6. The control unit of claim 1, wherein the context management unit is further configured to select the first active entry from among a plurality of active entries in the allocation table on a least recently used basis.

7. The control unit of claim 1, wherein the first input data comprises address information provided in the graphics command.

8. The control unit of claim 1, wherein the first input data comprises data supplied with the graphics command.

9. The control unit of claim 1, wherein the context management unit is configured to set a status flag of the entry E to indicate an active state as a part of (d).

10. The control unit of claim 1, wherein each of the plurality of processing pipelines comprises a direct memory access controller.

11. The control unit of claim 1, wherein each of the plurality of processing pipelines comprises a vertex processing unit configured to subdivide vertex chains into subchains.

12. The control unit of claim 1 further comprising an interconnection network coupled to each of the processing pipelines and to each of a set of render bus interfaces, wherein each of the render bus interfaces is configured to couple to a corresponding rendering pipeline, wherein the interconnection network is configured to transfer data between any of the processing pipelines and any of the render bus interfaces.

13. A method for controlling a plurality of processing pipelines in a graphics accelerator, the method comprising:

(a) receiving a graphics command comprising first input data from a central processing unit external to the graphics accelerator;

(b) decoding a process identifier from the first input data, wherein the process identifier identifies a specific one of one or more central processing units external to the graphics accelerator and one of a plurality of processes executing on the specific one of the central processing units;

(c) identifying an entry E in an allocation table that corresponds to the process identifier; and in response to a determination of the validity of a first set of conditions, (d) reassigning ownership of a first of the processing pipelines from a first active entry of the allocation table to the entry E, (e) loading state information from a context buffer in the entry E into the first processing pipeline, (f) sending the graphics command to the first processing pipeline;

wherein each of the processing pipelines are configured to control direct memory access transfers and subdivide chains of vertices into subchains.

14. The method of claim 13, wherein the first set of conditions comprises a first condition that the entry E is inactive and a second condition that there are no unclaimed processing pipelines.

15. The method of claim 13 further comprising sending the graphics command to a second processing pipeline designated by a pipeline list in the entry E and not performing (d), (e) and (f) in response to a determination that the entry E is active.

16. The method of claim 13 further comprising: in response to a determination that the entry E is inactive and that there is at least one unclaimed processing pipeline among the plurality of processing pipelines, assigning ownership of a first of the unclaimed processing pipelines to the entry E and not performing (d), (e) and (f).

17. The method of claim 13, wherein said reassigning ownership of the first processing pipeline from the first active entry to the entry E comprises removing a numeric designator corresponding to the first processing pipeline from a list in the active entry and adding said numeric designator to a list in the entry E.

18. The method of claim 13 further comprising selecting the first active entry from among a plurality of active entries in the allocation table on a least recently used basis.

19. The method of claim 13 where (d) comprises setting a status flag of the entry E to indicate an active state.

20. The method of claim 13, wherein each of the processing pipelines is further configured to perform format conversion of data provided with said graphics command.

21. A system comprising:

a plurality of means for performing pipelined processing of graphics commands in a graphics accelerator;

a means for storing central processing unit information in an allocation table, wherein said information comprises process identifiers, and wherein each process identifier identifies a specific one of one or more central processing units external to the graphics accelerator and one of a plurality of processes executing on the specific one of the central processing units; and a means for managing hardware context for multiple processes executing on one or more central processing units, wherein the management means is configured to:

(a) receive a graphics command;

(b) decode a process identifier from the graphics command, wherein the process identifier corresponds to one of the multiple processes; and (c) identify an entry E in the allocation table that corresponds to the process identifier;

wherein, in response to a first condition, the management means is further configured to:

(d) reassign ownership of a first of the plurality of pipelined processing means from a first active entry of the allocation table to the entry E, and (e) send the graphics command to the first pipelined processing means.

22. The system claim 21, wherein the management means is configured to perform (d) and (e) in response to the first condition that the entry E is inactive and that there are no unclaimed processing pipelines.

* * * * *